UNITED STATES PATENT OFFICE.

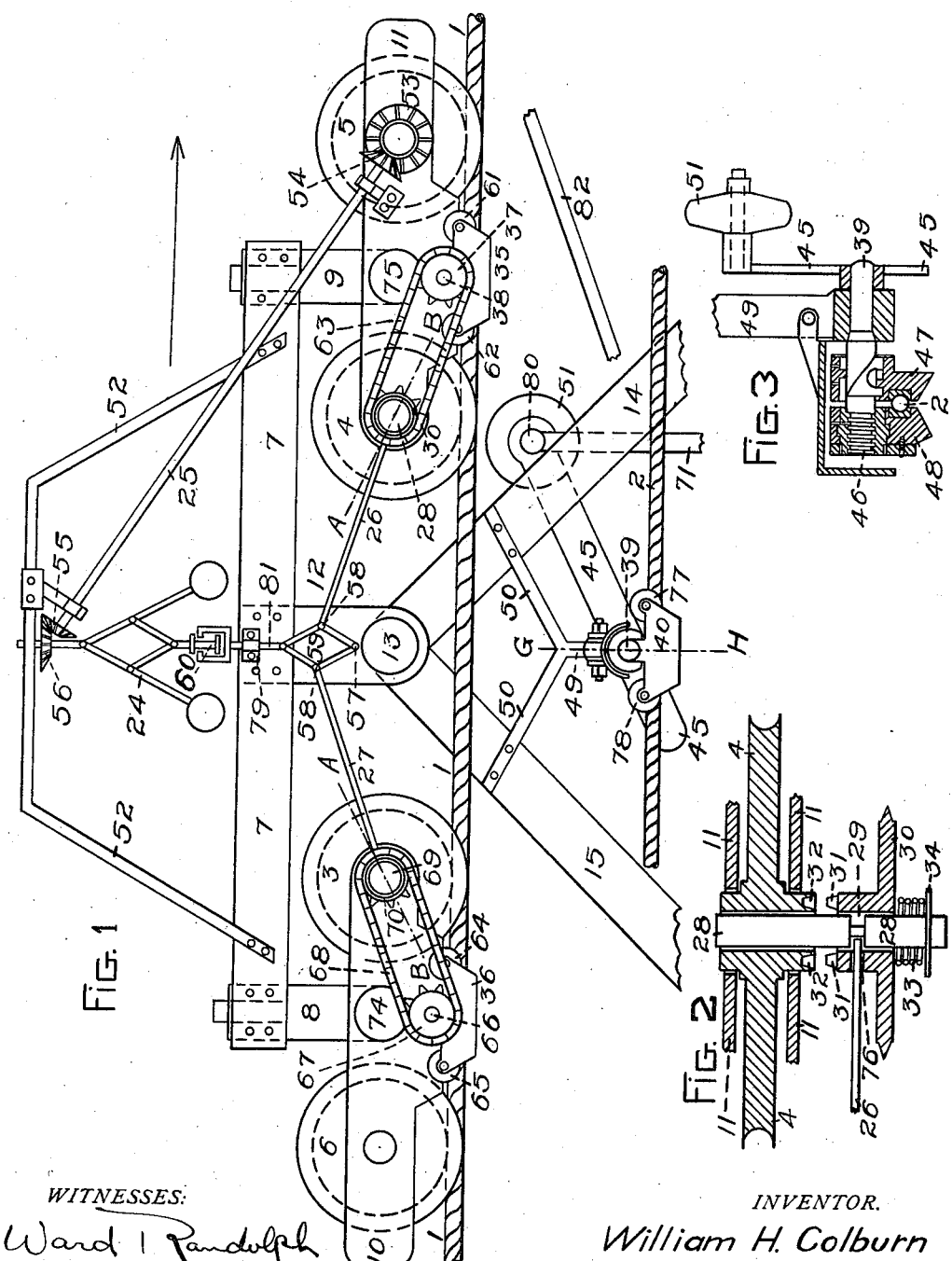

WILLIAM H. COLBURN, OF COLORADO SPRINGS, COLORADO.

TRUCK AND BRAKE FOR CABLE-RAILWAYS.

1,036,075.   Specification of Letters Patent.   Patented Aug. 20, 1912.

Application filed February 19, 1912. Serial No. 678,636.

*To all whom it may concern:*

Be it known that I, WILLIAM H. COLBURN, a citizen of the United States, residing at No. 9 South Weber street, Colorado Springs, in the county of El Paso and State of Colorado, have invented new and useful Improvements in Trucks and Brakes for Cable-Railways, of which the following is a specification.

My invention relates to improvements in trucks and brakes for cable railways in which a carrying truck is adapted to support a car for transporting passengers or wares, pivotally suspended so as to maintain, by gravitation, a level floor, said truck having an automatic brake appliance for instantaneously locking the truck to the carrying cable in cases of emergency; and the objects of my improvements are, first, to provide a safe means for passengers to be conveyed on a cable railway; second, to provide means to have the car maintain a level floor and an even regular motion forward; third, to provide means for stopping the car without stopping the traction cable; fourth, to provide an automatic gripping appliance on the truck of the car that is adapted to lock itself automatically to the carrying cable in case of an excessive speed being acquired by the truck. I attain these objects by the mechanism illustrated in the accompanying drawings, in which—

Figure 1, is a side elevation of the truck resting upon the carrying cable 1, and showing the connection with the centrifugal governor and the friction grip for the traction cable 2. Fig. 2, is a detailed section of wheels 4 and 30 taken on the line A—B, of Fig. 1. Fig. 3, is a detailed section of the friction grip 40, on the line G—H, of Fig. 1.

Similar letters and similar numerals refer to similar parts throughout the several views.

The four wheeled cable railway truck and the governor and automatic brake form the framework to the principal parts of my invention. The four wheeled carriage shown in Fig. 1, has the supporting beam 7, and is provided with the upright pivot 8, supporting the rear end of the beam 7, and resting upon a pivotal bearing 74, in the rear truck frame 10, between the front wheel 3, and the rear wheel 6. The front end of the supporting beam 7, is supported by the upright pivot 9, resting upon the pivotal bearing 75, in the front truck frame 11, between the rear wheel 4, and the front wheel 5. Intermediate the upright pivots 8, and 9, is the hanger bracket 12, rigidly secured to the supporting beam 7, and pendant therefrom and above the carrying cable 1. The front hanger arm 14, and the rear hanger arm 15, of a passenger car are pivotally connected at 13, with the hanger bracket 12, so that the supporting beam 7, may have either end raised or lowered upon the carrying cable 1, and yet the floor of the car will maintain a level position by reason of gravitation from the hanger pivot 13.

Suspended securely and rigidly upon the bracket 50, 50, is the pendant attaching frame 49, carrying the friction grip 40, adapted to engage the traction cable 2. To the screw shaft 39, of the friction grip 40, is rigidly secured the lever 45, adapted to operate it and cause the inner jaw 47, and the outer jaw 48, to grip the traction cable 2, when the top end of the lever 45, is thrown forward to the right in the direction indicated by the arrow in Fig. 1. When the top of the lever 45, is thrown in the opposite direction the jaws are released from gripping the traction cable 2, by the operation of the screw shaft 39, opening the jaws 47, and 48.

To guard against accident, such as defective machinery operating the traction cable, or a breakage of the traction cable, and to guard against a "runaway" of the car from any cause, I have provided two locking grips on each carriage adapted to lock the carriage at both ends to the carrying cable 1. The locking grip 35, is located between the wheels of the front truck and is operated and constructed similarly to the friction grip 40, above described; the screw sprocket wheel 37, taking the place of the double lever 45, and the screw shaft 38, taking the place of the screw shaft 39. Between the wheels of the rear truck is the locking grip 36, which is similar to the locking grip 35, and is adapted to be locked to the carrying cable 1, when the truck is moving too rapidly in the direction indicated by the arrow in Fig. 1, while the locking grip 35, is adapted to be locked when the truck is going too fast in the opposite direction from that indicated by the arrow in Fig. 1.

In Fig. 2, is shown a clutch mechanism by which wheel 4, and wheel 30, may be rigidly locked together. In the axle 28, is a deep annular groove 29, into which is inserted the front detention rod 26, after passing through the hole 76, in the hub of the clutch sprocket wheel 30, which detention rod prevents the clutch spring 33, from expanding. Should the truck for any reason gain a greater speed than is desired, the accelerated motion of wheel 5, running on the carrying cable 1, would cause an increased motion of the bevel gear wheel 53, which drives the bevel gear wheel 54, and the driving shaft 25, which drives the bevel gear wheels 55, and 56, operating the centrifugal governor 24, which would cause the loose swivel joint 60, to rise, thus drawing up the contracting arms 59, 59, and bringing toward each other the pivotal connections 58, 58, thus withdrawing from their respective annular grooves 29, the front and rear detention rods 26, and 27, in Fig. 1, and as shown in Fig. 2, when 26, is withdrawn from 29, it will allow the clutch spring 33, which is compressed between the clutch sprocket wheel 30, and the clutch spring collar 34, rigidly secured to the axle 28, to expand and force the clutch sprocket wheel 30, against the rear wheel 4, of the front truck causing the clutch teeth 31, 31, on the inner edge of the hub of the clutch sprocket wheel 30, to be forced into the clutch recesses 32, 32, adapted to receive them in the edge of the hub of rear wheel 4. This will cause the rear wheel 4 to turn the clutch sprocket wheel 30, with it, thus operating the driving chain 63, which will turn the screw sprocket wheel 37, thus turning the screw shaft 38, upon which it is rigidly secured, which screw shaft 38, will lock the locking grip 35, upon the carrying cable 1, in the same manner that the turning of 39, would lock the jaws 47 and 48, on traction cable 2, as illustrated in Fig. 3.

The mechanism in the locking grip 35, and the locking grip 36, being substantially the same as in the friction grip 40, the shafts 38, and 66, bear the same relation to the grips 35, and 36, as the shaft 39, does to grip 40, in Fig. 1, and the screw sprocket wheels 37, and 67, bear the same relation to grips 35, and 36, as does the double lever 45, to the grip 40, in Fig. 1. The locking grip 35, of the front truck is supported upon the carrying cable 1, by means of the small carrying wheels 61, and 62, while the locking grip 36, between the wheels of the rear truck is supported on the carrying cable 1, by the small carrying wheels 64, and 65, and the friction clutch 40, of the traction cable 2, is supported by the small front and rear carrying wheels 77, and 78, respectively on the traction cable 2. The axle 69, is substantially the same as the axle 28, and bears the same relation to the rear detention rod 27, and the clutch sprocket wheel 70, that the axle 28, does to the front detention rod 26, and the clutch sprocket wheel 30. The driving chain 68, is the same as the driving chain 63, and bears the same relation to the clutch sprocket wheel 70, and the sprocket wheel 67, that the driving chain 63, bears to the clutch sprocket wheel 30, and the sprocket wheel 37. The two lower contracting arms 59, 59, are secured to the hanger bracket 12, at their lower ends by the fixed pivot 57. The upright part or lower slide 81, of the centrifugal governor 24, is secured to the hanger bracket 12, by the swivel slide guide 79. The top of the centrifugal governor 24, and its driving mechanism 55, and 56, are attached to the supporting frame 52, mounted above the truck in Fig. 1. At stations and at the termini of the cable railway line and other regular stopping stations the friction clutch 40, will be disengaged automatically from the traction cable 2, by reason of the trip roller 51, riding up over an incline 82, provided therefor thus allowing the car 72, to stop without stopping the traction cable 2.

I am aware that prior to my invention trucks and brake mechanism for railways have been used and that automatic release clutches have been used on transmission cables in cable railway conveyances; I therefore do not claim trucks and brakes and release clutches broadly.

I claim:—

1. In a truck and brake appliance for a traction cable railway for the transportation of passengers and material, the combination of a carrying cable with a four wheeled carrying truck, having a release rod so connected with a centrifugal governor that at high velocity it will be withdrawn from an annular groove in an axle of the carriage and release a compressed spring adapted to force a grip operating sprocket wheel into clutch connection with a rotating truck wheel, and having a driving mechanism adapted to cause a safety brake grip to engage said carrying cable so provided as to stop the car, substantially as set forth and for the purposes specified.

2. In a truck and brake appliance for a traction cable railway for the transportation of passengers and material, the combination of a tandem four wheeled carrying truck provided with an automatic safety grip mechanism to cause said brake grip to engage said cable, a detention rod adapted to hold said mechanism out of engagement with the driving wheel of the truck by passing through the hub of the operating wheel of same, and into an annular groove of the axle of the drive wheel, a compressed spring on said axle adapted to force said operating wheel into clutch communication with said drive wheel when said detention rod is withdrawn from said annular grove, a centrifugal governor operated in harmony with said drive wheel and adapted to withdraw said detention rod from said groove at high speed, substantially as set forth and for the purposes specified.

3. In a truck and brake appliance for traction cable railways provided for carrying passengers, the combination with a carrying cable used as a track for carrying trucks and a transmission cable to move said trucks, of a long beam supported at each end by an upright post pivoted vertically in said beam, each of said posts resting upon a horizontal pivot transverse to a frame parallel to said beam and each of said parallel frames being supported by a wheel near each of its ends adapted to travel upon said cable, and a centrifugally operated safety grip brake under each of said frames adapted to grip said cable when the said truck shall have attained an excessive speed, for the purposes of stopping the truck, substantially as set forth and for the purposes specified.

4. In a truck and brake appliance for traction cable railways provided for carrying passengers, the combination with a carrying cable used as a track for carrying trucks and a transmission cable provided to move said trucks, of a long beam supported at each end by an upright post pivoted vertically in said beam, each of said posts resting upon a horizontal pivot transverse to a frame parallel to said beam and each of said parallel frames being supported by a wheel near each of its ends and adapted to travel upon said carrying cable, an automatically operated centrifugal safety brake grip under each of said frames adapted to grip said cable when the said truck shall have attained an excessive speed, the rear grip adapted to stop the truck from going forward and the front grip to stop the truck from going backward, substantially as set forth and for the purposes specified.

5. In a traction cable railway appliance provided for carrying passengers, the combination with a carrying cable used as a track for carrying trucks and a transmission cable to move said trucks, of a carrying truck having four wheels in tandem and provided with a centrifugally governed automatic safety grip adapted to automatically stop the truck when it exceeds a certain velocity, and of an operating mechanism to force said grip to engage said cable, a detention rod adapted to hold said operating mechanism out of engagement with the driving wheel of the truck by passing through the hub of the operating wheel of same, and into an annular groove of the axle of the drive wheel, a compressed spring on the axle adapted to force said operating wheel into clutch communication with said drive wheel when said detention rod is withdrawn from said annular groove, and a centrifugal governor operated in harmony with said drive wheel and adapted to withdraw said detention rod from said groove, substantially as set forth and for the purposes specified.

6. In a truck and brake for a traction cable railway provided for carrying passengers, the combination with a carrying cable used as a track for carrying trucks and a transmission cable to move said trucks, of a carrying truck having four carrying wheels in tandem and provided with an automatic safety brake grip adapted to automatically stop the truck and lock it to the carrying cable when it exceeds a certain velocity, with an operating mechanism to force said grip to engage said cable, a detention rod adapted to hold said operating mechanism out of engagement with the driving wheel of the truck by passing through the hub of the operating wheel of same, and into an annular groove in the axle of the drive wheel, a compressed spring on said axle adapted to force said operating wheel into clutch communication with said drive wheel when said detention rod is withdrawn from said annular groove, and a centrifugal governor operated in harmony with said drive wheel and adapted to withdraw said detention rod from said groove when an excessive speed is attained, substantially as set forth and for the purposes specified.

WILLIAM H. COLBURN.

Witnesses:
GERTRUDE HERREN,
FRANKLIN BEATTIE.

---

Copies of this patent may be obtained for five cents each, by addressing the "Commissioner of Patents, Washington, D. C."